US012413881B2

(12) United States Patent
Li et al.

(10) Patent No.: US 12,413,881 B2
(45) Date of Patent: Sep. 9, 2025

(54) FRONT COVER STRUCTURE AND SOUNDER

(71) Applicant: AAC Microtech (Changzhou) Co., Ltd., Jiangsu (CN)

(72) Inventors: Qibo Li, Changzhou (CN); Siyuan Ni, Changzhou (CN); Jingwei Yu, Changzhou (CN); Zhongfeng Gao, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 247 days.

(21) Appl. No.: 18/327,033

(22) Filed: May 31, 2023

(65) Prior Publication Data

US 2024/0298099 A1 Sep. 5, 2024

Related U.S. Application Data

(63) Continuation of application No. PCT/CN2023/090395, filed on Apr. 24, 2023.

(30) Foreign Application Priority Data

Mar. 2, 2023 (CN) ........................ 202320371955.2

(51) Int. Cl.
*H04R 1/02* (2006.01)
*H04R 9/02* (2006.01)
*H04R 9/06* (2006.01)

(52) U.S. Cl.
CPC ............ *H04R 1/023* (2013.01); *H04R 9/025* (2013.01); *H04R 9/06* (2013.01); *H04R 2400/11* (2013.01)

(58) Field of Classification Search
CPC .......... H04R 1/023; H04R 9/025; H04R 9/06; H04R 2400/11; H04R 31/003; H04R 7/18
See application file for complete search history.

(56) References Cited

FOREIGN PATENT DOCUMENTS

| | | | | | |
|---|---|---|---|---|---|
| CN | 213661917 U | * | 7/2021 | ............... | H04R 9/06 |
| CN | 109413562 B | * | 8/2021 | ........... | H04R 31/003 |
| KR | 101707836 B1 | * | 2/2017 | .............. | H04R 7/18 |

* cited by examiner

*Primary Examiner* — Angelica M McKinney
(74) *Attorney, Agent, or Firm* — Wiersch Law Group

(57) ABSTRACT

A sounder includes a frame with an accommodating space, a magnetic circuit unit fixed in the accommodating space of the frame, a vibration unit fixed to the frame and spaced apart from the magnetic circuit unit and driven by the magnetic circuit unit to vibrate, and a front cover structure covering the frame and the vibration unit and made of sheet metal. The front cover structure includes a middle protrusion portion, an extension plate extending outward from an edge of the protrusion portion, and an assembly ring provided at an outer edge of the extension plate. The protrusion portion, the extension plate, the assembly ring and the vibration unit define a front cavity. The front cover structure made of the sheet metal with a limited thickness can satisfy requirements of the sounder on the structural strength, assembly stability and internal space, and improves sound production performance of the sounder.

16 Claims, 5 Drawing Sheets

A

FRONT COVER STRUCTURE AND SOUNDER

TECHNICAL FIELD

The invention belongs to the technical field of sound production device, and particularly relates to a front cover structure and a sounder.

BACKGROUND

As a device for converting an electrical signal into a sound signal, a speaker has been widely applied to such mobile terminals as mobile phones and computers.

Usually, a sounder serves as a sound production device in the speaker. The sounder includes a frame, a magnetic circuit unit in the frame, a vibration unit connected to the frame and driven by the magnetic circuit unit to vibrate, and a front cover structure provided at one side of the frame. In a related art, the front cover structure needs to cover one side of the frame. At an edge of a covering side of the front cover structure, a support structure thicker and wider than the whole front cover structure is provided, so as to ensure a structural strength, an assembly stability and an internal space of the sounder.

For a front cover structure made of plastic, the support structure is realized easily. However, for a front cover structure made of sheet metal, due to a limited thickness of the sheet metal, the support structure with a corresponding required size is hardly achieved in the conventional design of the front cover structure. This cannot satisfy performance requirements of the sounder.

SUMMARY

An objective of the invention is to provide a front cover structure and a sounder. The front cover structure made of sheet metal with a limited thickness can satisfy requirements of the sounder on the structural strength, assembly stability and internal space, and improves sound production performance of the sounder.

The invention provides a front cover structure, which can be applied to a sounder. The front cover structure is made of sheet metal. The front cover structure includes a protrusion portion in middle of the front cover structure, an extension plate extending outward from an edge of the protrusion portion, and an assembly ring provided at an outer edge of the extension plate and surrounding a periphery of the protrusion portion. The protrusion portion, the extension plate, and the assembly ring define an avoiding cavity. A sound hole communicating with the avoiding cavity is formed in the protrusion portion. The assembly ring is formed by superimposing at least two layers each made of the sheet metal.

As an improvement, the assembly ring extends outward to form an extension edge. At least two limiting notches are formed in an outer side of the extension edge.

As an improvement, the extension edge has corner positions. Each of the corner positions of the extension edge is provided with one of the at least two limiting notches.

As an improvement, the assembly ring has a width between 0.4 mm and 0.5 mm, and a thickness between 0.3 mm and 0.36 mm.

As an improvement, a ratio of the thickness of the assembly ring to a thickness of the extension plate is between 1.5 to 2.5.

As an improvement, the protrusion portion is formed by deep drawing.

As an improvement, the assembly ring is formed by rotary heading.

As an improvement, the invention provides a sounder. The sounder includes a frame with an accommodating space, a magnetic circuit unit fixed in the accommodating space of the frame, a vibration unit fixed to the frame and spaced apart from the magnetic circuit unit and driven by the magnetic circuit unit to vibrate, and a front cover structure covering the frame and the vibration unit. The front cover structure includes a protrusion portion in middle of the front cover structure, an extension plate extending outward from an edge of the protrusion portion, and an assembly ring provided at an outer edge of the extension plate and surrounding a periphery of the protrusion portion. The protrusion portion, the extension plate, and the assembly ring define an avoiding cavity. A sound hole communicating with the avoiding cavity is formed in the protrusion portion. The assembly ring is formed by superimposing at least two layers each made of the sheet metal. The protrusion portion, the extension plate, the assembly ring and the vibration unit enclose a front cavity.

As an improvement, the assembly ring extends outward to form an extension edge. At least two limiting notches are formed in an outer side of the extension edge.

As an improvement, the extension edge has corner positions. Each of the corner positions of the extension edge is provided with one of the at least two limiting notches.

As an improvement, the assembly ring has a width between 0.4 mm and 0.5 mm, and a thickness between 0.3 mm and 0.36 mm.

As an improvement, a ratio of the thickness of the assembly ring to a thickness of the extension plate is between 1.5 to 2.5.

As an improvement, the protrusion portion is formed by deep drawing.

As an improvement, the assembly ring is formed by rotary heading.

The invention has the following beneficial effects.

According to the solutions, the front cover structure is made of sheet metal. The assembly ring is provided at an outer edge of the extension plate and surrounds a periphery of the protrusion portion. The assembly ring is formed by superimposing at least two layers each made of sheet metal. The assembly ring can be thicker than the sheet metal. The front cover structure is assembled with the frame of the sounder through the assembly ring, which can ensure a structural strength of the sounder, and makes assembly more stable and reliable. Moreover, because of a larger thickness of the assembly ring, the avoiding cavity enclosed by the assembly ring, the extension plate and the protrusion portion has a larger size. Consequently, the front cavity formed between the front cover structure and the vibration unit has a larger size, thereby achieving better sound production performance of the sounder.

DETAILED DESCRIPTION OF EMBODIMENTS

The invention is further described below with reference to the drawings and implementations.

Figure 1:
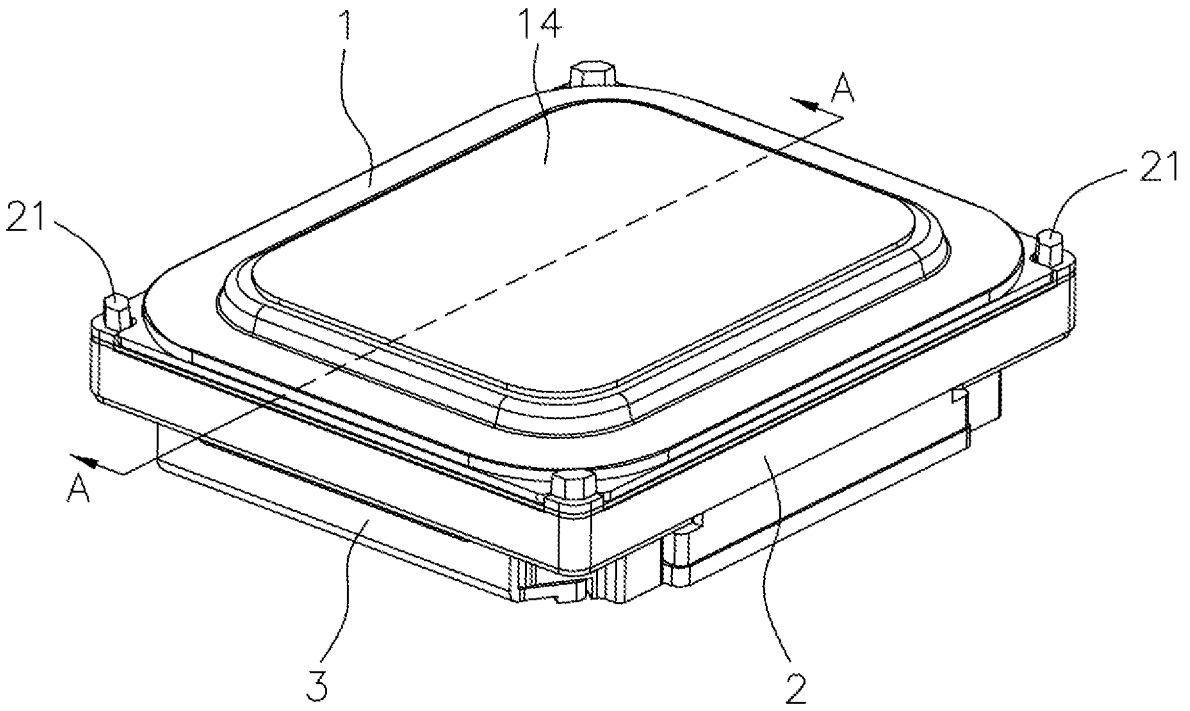
FIG. 1 is an overall structural view of a sounder according to the invention.
Figure 2:
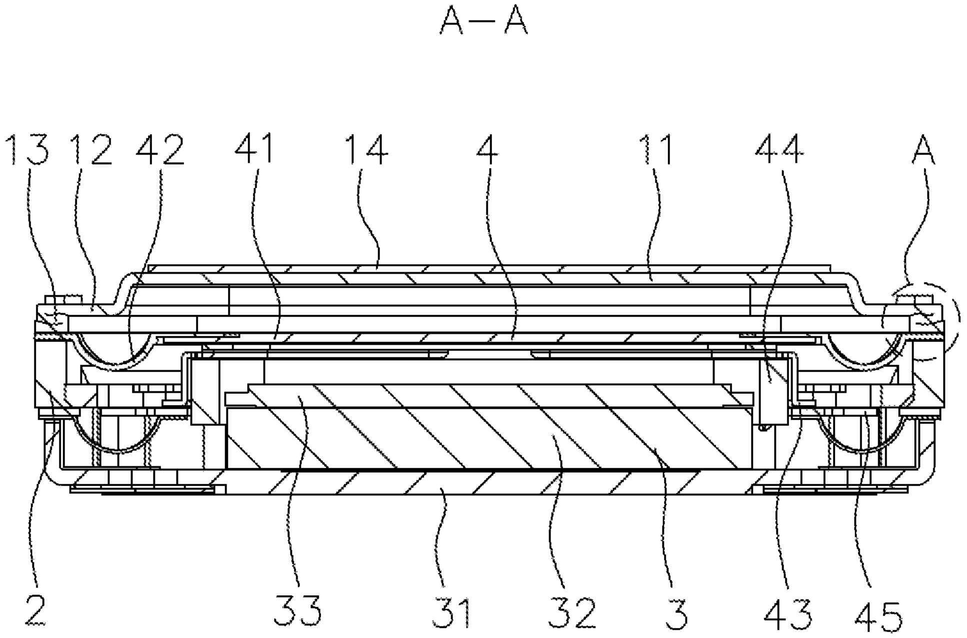
FIG. 2 is a sectional view of a sounder in a direction A-A shown in FIG. 1 according to the invention.
Figure 3:
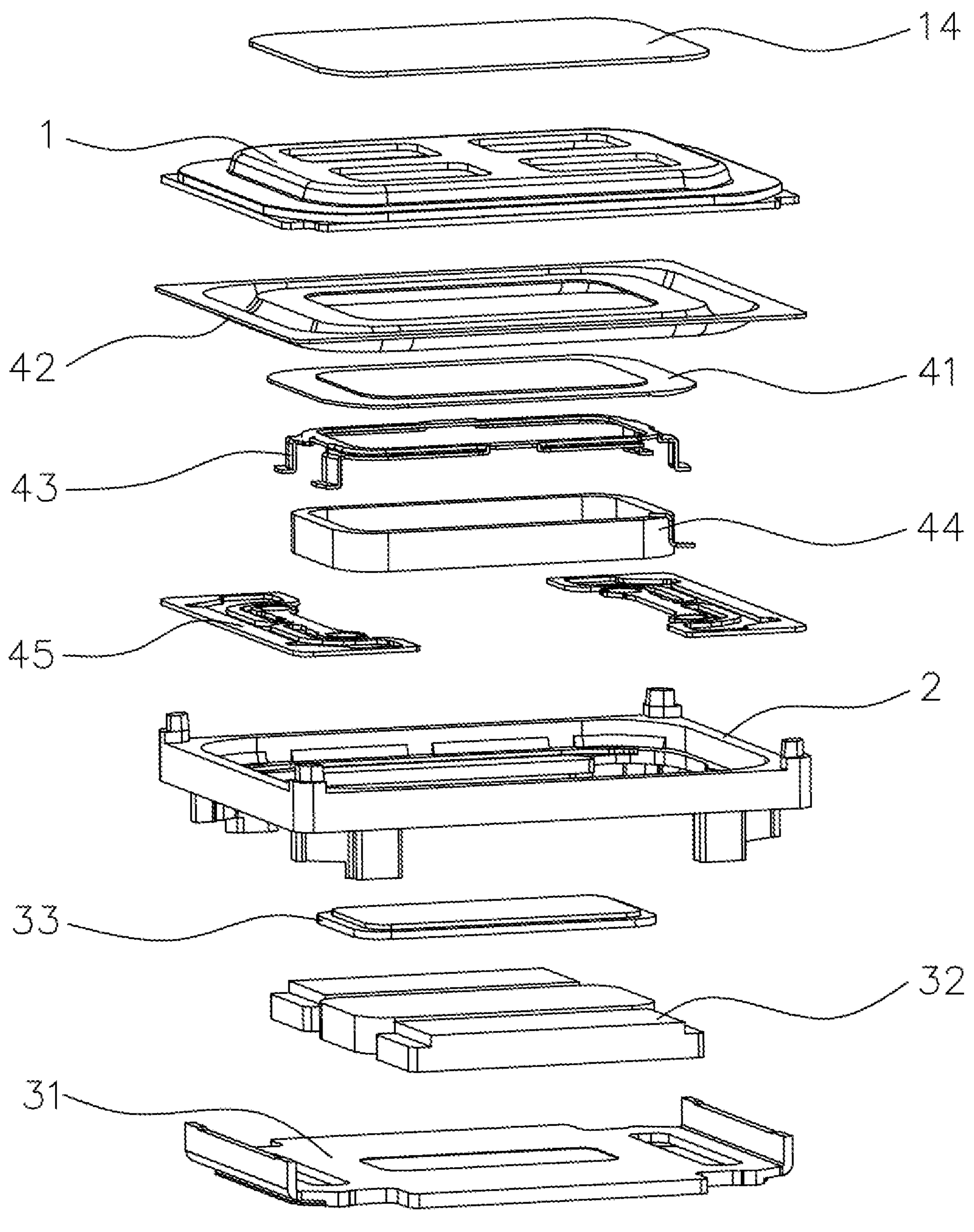
FIG. 3 is a perspective exploded view of a sounder according to the invention.
Figure 4:
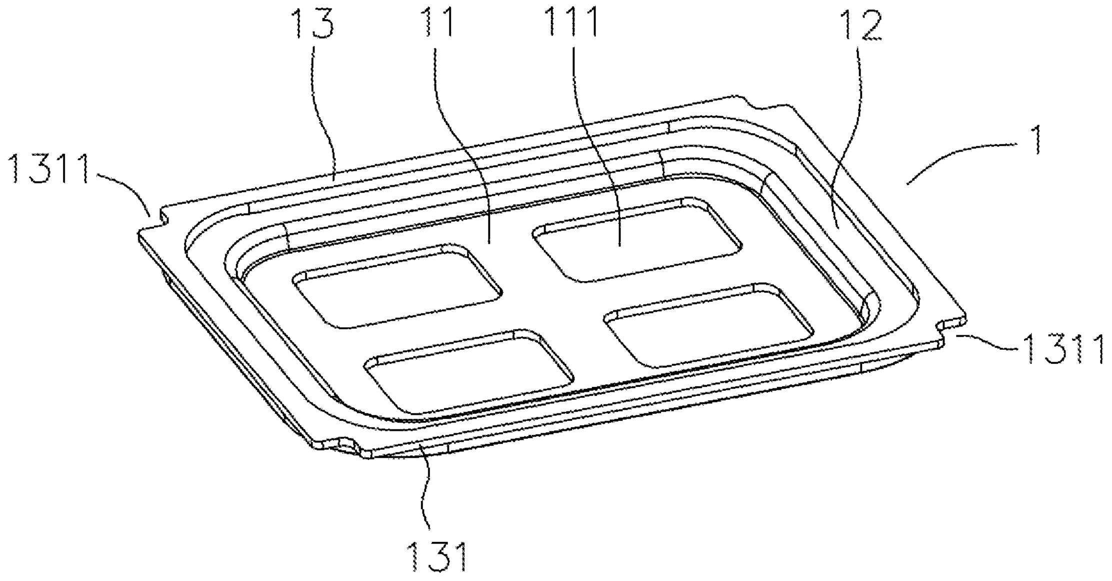
FIG. 4 is an overall structural view of a front cover structure according to the invention.
Figure 5:
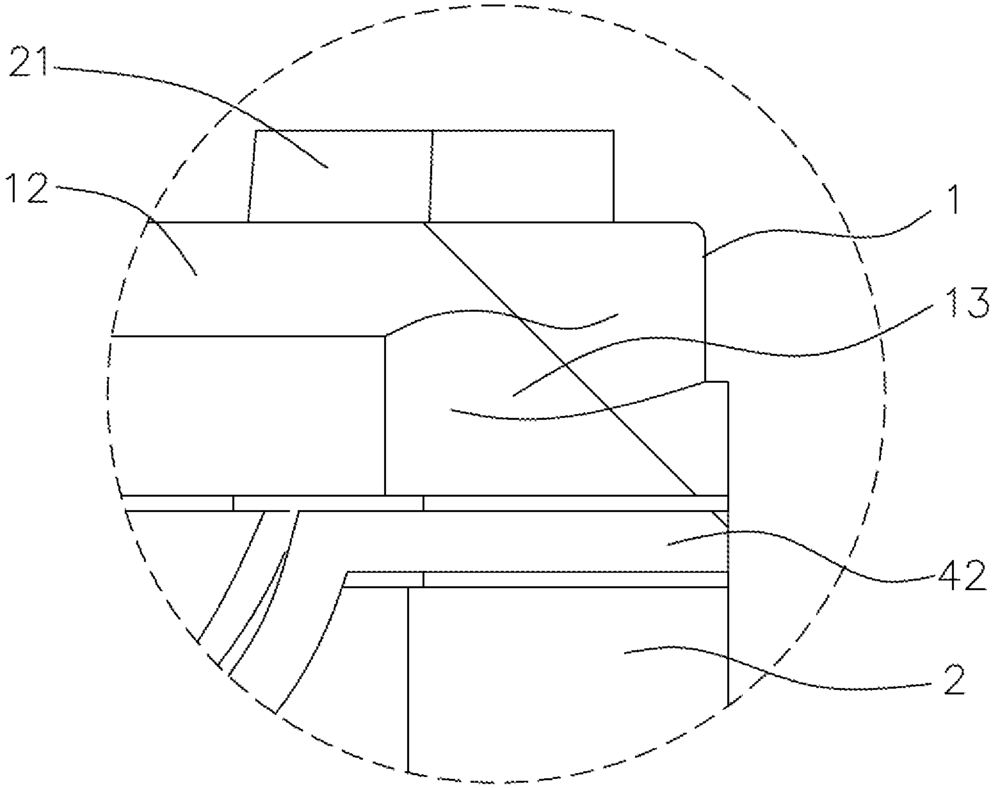
FIG. 5 is an enlarged view of A shown in FIG. 1.

Referring to FIGS. 1-3, the invention provides a sounder, including a frame 2 with an accommodating space, a magnetic circuit unit 3 fixed in the accommodating space of the frame 2, and a vibration unit 4 fixed to the frame 2 and spaced apart from the magnetic circuit unit 3. The vibration unit 4 is driven by the magnetic circuit unit 3 to vibrate. The sounder further includes a front cover structure 1 covering the frame 2 and the vibration unit 4. Referring to FIGS. 2-5, the front cover structure 1 is made of sheet metal. The front cover structure 1 includes a protrusion portion 11 in middle of the front cover structure, an extension plate 12 extending outward from an edge of the protrusion portion 11, and an assembly ring 13 provided at an outer edge of the extension plate 12 and surrounding a periphery of the protrusion portion 11. The protrusion portion 11, the extension plate 12, and the assembly ring 13 define an avoiding cavity. A sound hole 111 communicating with the avoiding cavity is formed in the protrusion portion 11. The assembly ring 13 is formed by superimposing at least two layers of sheet metal. The protrusion portion 11, the extension plate 12, the assembly ring 13, and the vibration unit 4 enclose a front cavity.

According to the solutions, the front cover structure 1 is made of sheet metal. The assembly ring 13 is provided at an outer edge of the extension plate 12 and surrounds a periphery of the protrusion portion 11. The assembly ring 13 is formed by superimposing at least two layers of sheet metal. The assembly ring 13 can be thicker than the sheet metal. The front cover structure 1 is assembled with the frame 2 of the sounder through the assembly ring 13, which can ensure a structural strength of the sounder, and makes assembly more stable and reliable. Because of a larger thickness of the assembly ring 13, the avoiding cavity enclosed by the assembly ring 13, the extension plate 12 and the protrusion portion 11 has a larger size. Consequently, the front cavity formed between the front cover structure 1 and the vibration unit has a larger size, thereby achieving better sound production performance of the sounder.

In an embodiment, the magnetic circuit unit 3 includes a yoke 31 fixed to one side of the frame 2, a magnet assembly 32 fixed to the yoke 31, and a pole plate 33 fixed to a side of the magnet assembly 32 away from the yoke 31. A magnetic gap is formed in the magnet assembly 32. The vibration unit 4 includes a dome 41 spaced apart from the magnet assembly 32, a voice diaphragm 42 with an inner edge fixed to an outer side of the dome 41 and an outer edge fixed to the frame 2, a holder 43 fixed to the home 41, a voice coil 44 fixed to the holder 43 and accommodated in the magnetic gap, and a flexible printed circuit board (PCB) 45 with two sides separately fixed to the frame 2 and the holder 43. The assembly ring 13 of the front cover structure 1 is attached to a side of the voice diaphragm 42 away from the frame 2 through an adhesive. A dust guard 14 covering the sound hole 111 is attached to a side of the front cover structure 1 away from the frame 2.

In an embodiment, the assembly ring 13 extends outward to form an extension edge 131. At least two limiting notches 1311 are formed in an outer side of the extension edge 131. In an embodiment, the extension edge 131 has corner positions. Each of the corner positions of the extension edge 131 is provided with one of the limiting notches 1311. In an embodiment, the whole front cover structure 1 has a rectangular contour in the embodiment. The extension edge 131 has four corner positions. Each of the corner positions is provided with one of the limiting notches 1311. The limiting notch 1311 has two limiting surfaces. Corner positions at a side of the frame 2 covered with the front cover structure 1 are protruded to form limiting posts 21. When the front cover structure 1 is assembled to the frame 2, four limiting posts 21 are embedded into four limiting notches 1311. The limiting posts 21 each abut against two limiting surfaces of a corresponding one of the limiting notches 1311. Therefore, the assembly between the front cover structure 1 and the frame 2 is more accurate, and the structure is more reliable and stable. In some embodiments, the shape of the front cover structure 1 can be adaptively provided according to an actual situation. For example, the extension edge 131 is provided with three, five or six corner positions. Each corner position is provided with one limiting notch 1311. Accordingly, corresponding limiting posts 21 are provided at corresponding positions of the frame 2.

In an embodiment, a ratio of a thickness of the assembly ring 13 to a thickness of the extension plate 12 is between 1.5 to 2.5. In an embodiment, the assembly ring 13 has a width between 0.4 mm and 0.5 mm, and the thickness between 0.3 mm and 0.36 mm. In the embodiment, the sheet metal for machining the front cover structure 1 has a thickness of 0.15 mm. The protrusion portion 11 of the front cover structure 1 is formed by deep drawing. Upon formation of the protrusion portion 11, the sheet metal is further drawn and then subjected to rotary heading to form the assembly ring 13. The assembly ring 13 is machined with three layers of the sheet metal by the rotary heading. Hence, the assembly ring 13 is thicker than the initial sheet metal to achieve a higher structural strength. Moreover, the assembly ring 13 is protruded from the extension plate 12. This can make the avoiding space thicker and the front cavity larger to meet requirements on the internal space of the sounder. The assembly ring 13 has the width of 0.4 mm to 0.5 mm, which can satisfy a broadening requirement of an adhered surface when the assembly ring 13 is assembled with a surface of the voice coil 44.

It is to be understood that the width and thickness of the assembly ring 13 can be adaptively provided according to an actual situation. Accordingly, the initial thickness of the sheet metal for machining the front cover structure 1 can also be adaptively provided, and is 0.1 mm, 0.2 mm or 0.3 mm for example. For the sake of actual application requirements in the rotary heading, the assembly ring 13 can be formed by two, three or four layers of the sheet metal to achieve different thicknesses and widths. For example, the thickness of the assembly ring 13 may be 1.5 times, 1.8 times or 2.1 times the initial thickness of the sheet metal. The width of the assembly ring 13 may be 2 times, 2.5 times, 3 times or 4 times the thickness of the sheet metal.

The above described are merely implementations of the invention. It should be noted here that those of ordinary skill in the art may make improvements without departing from the concept of the invention, but such improvements should fall within the protection scope of the invention.

What is claimed is:

1. A front cover structure, applied to a sounder and made of sheet metal, wherein the front cover structure comprises a protrusion portion in middle of the front cover structure, an extension plate extending outward from an edge of the protrusion portion, and an assembly ring provided at an outer edge of the extension plate and surrounding a periphery of the protrusion portion, wherein the protrusion portion, the extension plate, and the assembly ring define an avoiding cavity; a sound hole communicating with the avoiding cavity is formed in the protrusion portion; and the assembly ring is formed by superimposing at least two layers each made of the sheet metal; wherein the assembly ring has a width between 0.4 mm and 0.5 mm, and a thickness between 0.3 mm and 0.36 mm.

2. The front cover structure as described in claim 1, wherein the assembly ring extends outward to form an extension edge, wherein at least two limiting notches are formed in an outer side of the extension edge.

3. The front cover structure as described in claim 2, wherein the extension edge has corner positions, and each of the corner positions of the extension edge is provided with one of the at least two limiting notches.

4. The front cover structure as described in claim 3, wherein a ratio of the thickness of the assembly ring to a thickness of the extension plate is between 1.5 to 2.5.

5. The front cover structure as described in claim 2, wherein a ratio of the thickness of the assembly ring to a thickness of the extension plate is between 1.5 to 2.5.

6. The front cover structure as described in claim 1, wherein a ratio of the thickness of the assembly ring to a thickness of the extension plate is between 1.5 to 2.5.

7. The front cover structure as described in claim 6, wherein the protrusion portion is formed by deep drawing.

8. The front cover structure as described in claim 6, wherein the assembly ring is formed by rotary heading.

9. A sounder, comprising:

a frame with an accommodating space;

a magnetic circuit unit fixed in the accommodating space of the frame;

a vibration unit fixed to the frame and spaced apart from the magnetic circuit unit, wherein the vibration unit is driven by the magnetic circuit unit to vibrate; and a front cover structure covering the frame and the vibration unit, wherein the front cover structure is made of sheet metal and comprises a protrusion portion in middle of the front cover structure, an extension plate extending outward from an edge of the protrusion portion, and an assembly ring provided at an outer edge of the extension plate and surrounding a periphery of the protrusion portion, wherein the protrusion portion, the extension plate and the assembly ring define an avoiding cavity; a sound hole communicating with the avoiding cavity is formed in the protrusion portion; and the assembly ring is formed by superimposing at least two layers each made of the sheet metal; and wherein the protrusion portion, the extension plate, the assembly ring, and the vibration unit define a front cavity; wherein the assembly ring has a width between 0.4 mm and 0.5 mm, and a thickness between 0.3 mm and 0.36 mm.

10. The sounder as described in claim 9, wherein the assembly ring extends outward to form an extension edge, wherein at least two limiting notches are formed in an outer side of the extension edge.

11. The sounder as described in claim 10, wherein the extension edge has corner positions, and each of the corner positions of the extension edge is provided with one of the at least two limiting notches.

12. The sounder as described in claim 11, wherein a ratio of the thickness of the assembly ring to a thickness of the extension plate is between 1.5 to 2.5.

13. The sounder as described in claim 10, wherein a ratio of the thickness of the assembly ring to a thickness of the extension plate is between 1.5 to 2.5.

14. The sounder as described in claim 9, wherein a ratio of the thickness of the assembly ring to a thickness of the extension plate is between 1.5 to 2.5.

15. The front cover structure as described in claim 14, wherein the protrusion portion is formed by deep drawing.

16. The sounder as described in claim 14, wherein the assembly ring is formed by rotary heading.

* * * * *